United States Patent [19]
Breternitz, Jr. et al.

[11] Patent Number: 5,805,895
[45] Date of Patent: Sep. 8, 1998

[54] METHOD AND APPARATUS FOR CODE TRANSLATION OPTIMIZATION

[75] Inventors: Mauricio Breternitz, Jr.; Roger Alan Smith, both of Austin, Tex.

[73] Assignee: Motorola, Inc., Schaumburg, Ill.

[21] Appl. No.: 709,422

[22] Filed: Jun. 9, 1996

[51] Int. Cl.⁶ .................................................... G06F 9/445
[52] U.S. Cl. ........................ 395/709; 395/705; 395/708
[58] Field of Search .................... 395/709, 708, 395/500, 705, 706, 710, 707; 364/300

[56] References Cited

U.S. PATENT DOCUMENTS

| | | | |
|---|---|---|---|
| 4,802,091 | 1/1989 | Cocke et al. | 364/300 |
| 5,313,614 | 5/1994 | Goettelmann et al. | 395/500 |
| 5,537,620 | 7/1996 | Breternitz, Jr. | 395/700 |
| 5,655,122 | 8/1997 | Wu | 395/705 |
| 5,742,828 | 4/1998 | Canady et al. | 395/708 |

OTHER PUBLICATIONS

Paul Hohensee et al., "Wabi Cpu Emulation", Hot Chips VIII Symposium, Stanford, California, Aug. 19–20, 1996, pp. 47–65.

Robert F.Cmelik et al., "Shade: A Fast Instruction–Set Simulator for Execution Profiling", Techical Rpt. UWCSE 93–06–06, 1993, Univ.of Washington & Sun Microsystems, Inc., pp. 1–41.

Robert J. Barry and Paraskevas Evripidou, Extracting Parallelism in Fortran by Translation to a Single Assignment Intermediate Form, IEEE, 329–334, Jun. 1994.

Barbara G. Ryder and J. Stephen, Pendergrast, Experiments in Optimizing FP, IEEE, 444–454, Apr. 1988.

*Primary Examiner*—Tariq R. Hafiz
*Assistant Examiner*—Ted T. Vo
*Attorney, Agent, or Firm*—J. Gustav Larson

[57] ABSTRACT

A native microprocessor (20) accesses a foreign block of computer code. An initial block scope defining translation parameters is assigned to the block (106). The block of "foreign" code is translated to "native" code (108). An optimization efficiency is calculated for the translated block (110). A rescheduling criterion is established based on the optimization efficiency (112). The block of native code is executed (114). On subsequent accesses of the block when the reschedule criterion is met (116) the block scope is redefined (118).

17 Claims, 3 Drawing Sheets

METHOD AND APPARATUS FOR CODE TRANSLATION OPTIMIZATION

FIELD OF THE INVENTION

Generally, the present invention relates to the optimization of run time code translation, and more specifically to a method of optimizing translated code based upon program characteristics.

BACKGROUND OF THE INVENTION

Software migration tools are key components for enabling new computer architectures. Such tools allow usage of software from a "foreign" instruction set architecture to operate on a "native" instruction set architecture. Interpretive execution of foreign programs is a common method of making software available in a new architecture. However, there are execution overheads associated with interpretive methods.

Run-time translation is a method of overcoming such overheads. During run time translation, foreign code is translated into a native program form as execution proceeds. Examples of a foreign architecture running in a native form include an Intel x86 architecture code running on a Reduced Instruction Set Computer (RISC) machine, or Sun Microsystem's JAVA byte codes being used with just-in-time compilation.

However, run-time translation itself must be carefully controlled. The cost in time of optimizing the translation of a code fragment to native code is not warranted unless it can be recovered in subsequent execution of the translated code. Previous run-time translators perform optimization via data flow analysis over a limited region of the program. The size of the limited region is fixed and hard wired into the data flow algorithm. By limiting the size of the region, optimization that could be achieved through translating larger regions is not realized. This results in frequently executed code running with lower levels of performance than it would if it were translated with higher optimization and with data flow analysis over a larger region of the program. It is understood in the prior art that certain regions of program code will be executed more frequently than other sections of code. The prior art teaches using counters to monitor how many times a code section has been accessed. A recompilation of the code section can be triggered based on the number of times a code section has been executed. However, the code being re optimized may already be fully optimized resulting in unnecessary recompilation time.

Therefore, a desirable method of code translation that optimized code efficiency would minimize the amount of unwarranted optimization yet apply maximum optimizations where they are warranted would be desirable.

DETAILED DESCRIPTION OF PREFERRED EMBODIMENTS

Generally, the present invention provides a method of optimizing software translation. Specifically, when a microprocessor accesses a block of computer code, a determination is made whether or not the block has been previously translated. If the block has not been translated already, an initial scope is assigned defining how to perform translation of the block. The scope can encompass both the fragments of code which are to be translated together with the block to define a region to be translated as well as the level of optimizations which are to be applied.

The region of code is translated according to the initial scope. Once the translation has been completed, a further determination of the optimization efficiency is calculated to identify the level of efficiency realized during the translation. This optimization efficiency is used in conjunction with an optimization efficiency curve to specify a rescheduling criterion, which is used for specifying when a retranslation should occur. Each time the block is encountered, a determination is made whether the reschedule criterion is satisfied. If not, the block will be executed without further processing. Otherwise, a new block scope is defined and a new region retranslated according to the new scope.

Figure 1:
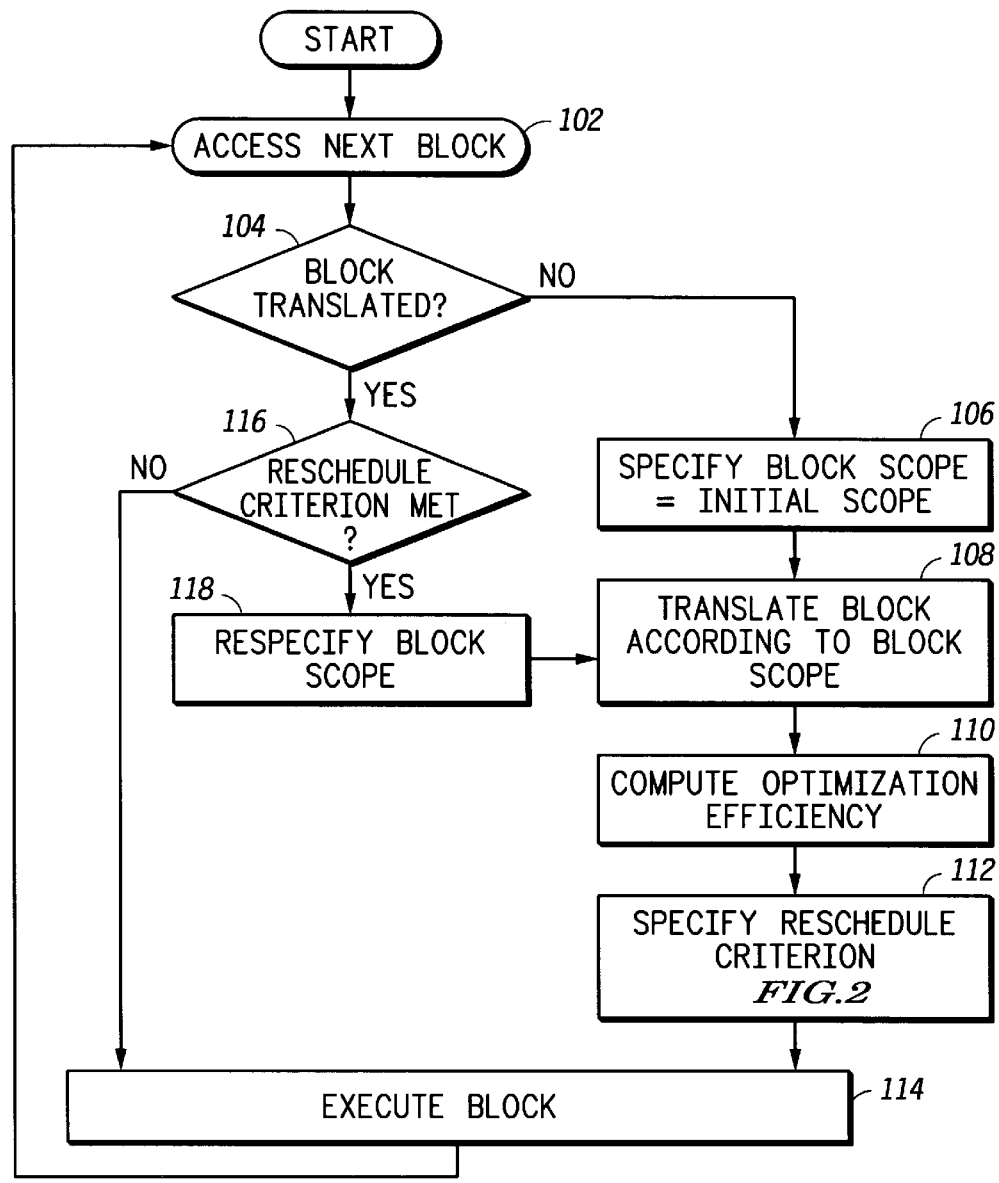
FIG. 1 illustrates, in flow diagram form, a method of code translation in accordance with the present invention.

FIG. 1 illustrates in flow diagram form a method in accordance with the present invention. At a first step 102 a block to be processed, or executed, is accessed. This block represents program code to be executed, and may be a single instruction or may represent a set of instructions to be processed together. For example, the block could be a basic block or a single-entry single-exit region. Next, at step 104, a determination is made of whether the encountered block has previously been translated. Flow proceeds to step 116 if the block has been previously translated, and to step 106 when untranslated code is encountered.

At step 106, the block scope for the accessed block is set to an initial scope. Generally, the initial scope will consist of predefined default values. For example, the block scope can define a minimal extent and level of optimization which would include the type of optimizations to be performed. A minimal extent, which specifies a region of code, and optimization level can be used the first time the code block is encountered where it is not initially known whether the expense of a more thorough translation is justified. By optimizing a minimum extent of code, time is saved at the expense of efficiency. Note that the initial scope could be defined to allow only a minimal translation with no optimization, as this would be the most time efficient when nothing is yet known about the importance of the code. The block extent defined in the block scope of step 106 specifies a region of code to be translated and is not necessarily equal in size to the block accessed at step 102. For example, if the next block represented a basic block of the program control flow, the block scope could specify a set of basic blocks of the program control flow to be translated together. For this initial scope, the region of program code to be translated and optimized may be larger, smaller, or equal to the block size of step 102.

Next, at step 108, the region is translated and optimized according to its block scope. Note that the optimization can be part of the translation, or be performed in a separate piece of code. Next, at step 110, the overall optimization efficiency of the translation is computed or estimated based on predefined criteria. The optimization efficiency quantifies the efficiency obtained in step 108 and is discussed in more detail below. Next, at step 112, a rescheduling criterion is specified for the region. This criterion is defined based on the computed efficiency of step 110 and an optimization curve. The optimization curve is discussed in greater detail with reference to FIG. 2. The rescheduling criterion specifies when the block scope should be redefined, and whether a new translation or optimization, or both, should occur. This is further discussed in reference to FIG. 2.

Next, at step 114, the translated region is executed. Following the execution of program code at step 114, a loop is formed by repeating step 102 to access the next block. The next block begins at the first instruction following the code executed at step 114.

Otherwise, at step 104, a determination is made whether the next block has been previously translated. If not, flow proceeds to step 116. At step 116, a determination is made whether or not the reschedule criterion, specified in step 112 has been met. It is appreciated that Step 116 could be implemented by a number of methods: in one alternative, the determination is included in the translated code; in another, a separate piece of code distinct from the translated code monitors the progression of program flow. If the criterion has not been met, flow proceeds to step 114 where the block of code is executed, otherwise flow proceeds to step 118.

At step 118, the block scope is redefined to allow for a greater level of optimization. In one embodiment of the present invention, the defined extension would increase the extent of code to be translated or re-optimized, and would increase the level of optimization to be used in the translation. Note that the new block scope may specify only an optimization enhancement be performed, or that only a new translation be performed using new translation parameters such as the extent of a region to be translated. It should be understood that other embodiments of the present invention could specify other actions aimed at improving the overall optimization of the code. Once this scope has been redefined, flow proceeds to step 108 where the new region, based on the defined block scope is optimized using the redefined block scope.

Figure 2:
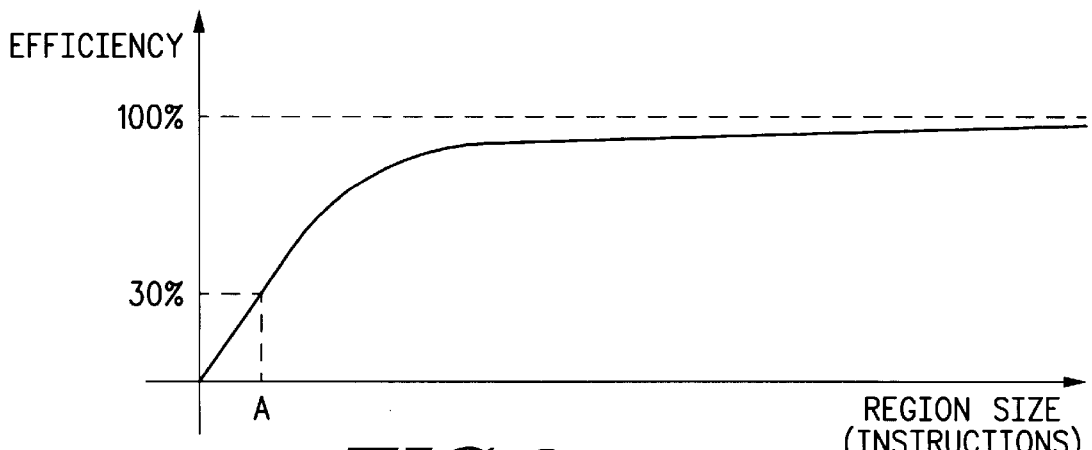
FIG. 2 illustrates, in graphical form, one example of an optimization efficiency curve.

FIG. 2 illustrates an optimization curve which indicates an overall efficiency of a region of code, and is used during step 112 for determining the reschedule criterion, as well as in step 118 for re-specifying a block scope. The horizontal axis of the graph of FIG. 2 indicates the extent of code or region size to be translated or optimized. The units of this axis indicate the amount of code to be translated whether instructions, basic blocks, single-entry single-exit regions, or other similar aggregate units. For larger code extents, it is likely to be beneficial to use these or other natural groupings of instructions. The scope assigned on first encountering foreign code would typically correspond to a smaller region size, while the scope of a block which has repeatedly met a criterion for retranslation would be much further to the right in FIG. 2, indicating a larger region size. Note that the origin will generally represent a minimum extent. The vertical axis represents an efficiency measure which would correspond to the code extent for a given scope.

FIG. 2 represents a specific, but representative, embodiment of an optimization curve for optimizing flag translation code. Flag translation code is used to generate native code that maintains the flag status information of code written for a foreign microprocessor. The maximum efficiency measure of FIG. 2 is 100%. For example, experience in translating code from a foreign processor to a new processor might show that in fact only about 30% of the flag computations are needed on the new processor. A particular embodiment could then project that the efficiency was high enough if the scope and optimization level of a block eliminated 70% of flag computations. For example, if an un-optimized translation of the region associated with a block and its scope would generate 20 flag computations, and 14 of these computations were eliminated through optimizations, that would be a basis, given the optimization curve, for determining that further optimizations would be unlikely to significantly increase the efficiency of the translated code.

Continuing with this example, if in translating a block and its scope as indicated by point A of FIG. 2 were done and only 21% of the flag computations were eliminated, the estimated efficiency would be 21%/70%=30%. It is understood that the curve of FIG. 2 is but one example of an optimization curve, and that different optimization curves can exist for use with different code regions, and that different measures of optimization, besides efficiency can also be defined. In this example, instead of using the efficiency, it would be possible to use the fraction of flag computations which were eliminated. The asymptotic behavior of the curve would occur at 70% elimination which corresponds to 100% efficiency in this case. In general, estimated efficiency measures like fraction of flag computations eliminated may be easier to compute than actual efficiencies.

The curve represented by FIG. 2 can be either predicted or tracked. Where the curve of FIG. 2 represents a tracked curve, it is generated in real time as the program being translated runs, and is based on actual translation efficiency results obtained in step 110 of the flow of FIG. 1. The tracked curve can be generated individually for each block, individually for blocks having met some threshold criterion, collectively for all blocks, or some combination of these cases. Over time the tracking curves will converge to represent the efficiency characteristics of the block or blocks they describe. By analyzing a number of regions or programs, and tracking their results, a predicted curve can be obtained and provided, or designed into a system for future use. This allows for either a dynamic determination of the efficiency curves, which can take additional run time, or providing a predicted curve which would save time.

It is understood that the optimization curve of FIG. 2 represents the use of a specific set of optimization options. As such, there may be multiple optimization curves for a given region representing different optimization options. As part of step 112 where the reschedule criterion is being defined, it is determined that based on the optimization curve it is beneficial to re-optimize to a different optimization curve which would allow a greater efficiency to be reached. This reschedule criterion would allow a new block scope to be set to provide greater optimization using different translation and optimization techniques. It should by now be recognized that this is an advantage over the prior art in that a determination can be made either in step 112 or step 118 based upon the optimization curve or curves when and how further optimization is warranted.

The information represented by an optimization curve is used to address the prior art problems. For example, if during step 118, where the scope is being redefined, and the region size is represented by A, the reschedule criterion indicates that extending the scope would improve efficiency, and gives information of how many executions of the block would be required to recover the cost of retranslation with a larger scope. If instead, the actual efficiency is near the maximum efficiency, the criterion would indicate that there is little point in extending the scope and retranslating the block.

Figure 3:
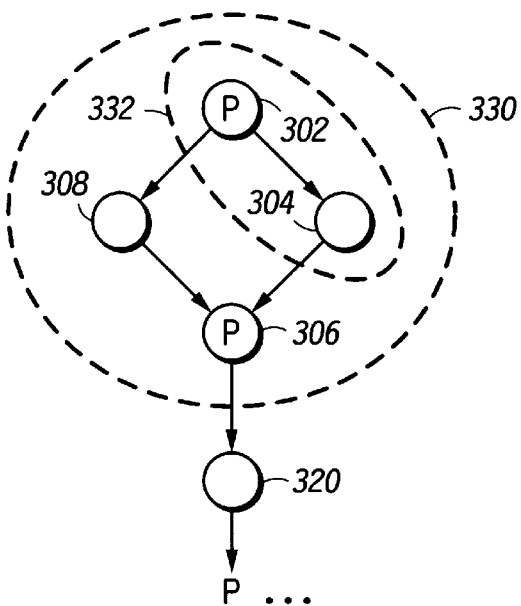
FIG. 3 illustrates, in graphical form, how extending a block extent can affect optimization efficiency.

FIG. 3 illustrates how an increase in extent can increase the efficiency of translation for a simple case of optimization of flag computations. In the execution of translated code, compilation of condition codes, or flags, can potentially have a large execution cost. It is common to have a one-to-one translation of a given foreign instruction to a native instruction, followed by a number of native instructions whose purpose is for computing, or emulating, flags or condition codes of the foreign architecture. Data flow analysis is one way to optimize computations of flags. The key observation is that many of the foreign condition codes that are computed are rarely used. For example in FIG. 3, computation of the parity flag is represented by P within blocks 302 and 306. If the block 302 were defined to be the region being translated, the parity flag computation would be considered "live out", or needed outside of the block 302. Therefore the translated code for the block 302 would have to include instructions to generate the parity bit since it might be used by some later block. If however, the system were able to look at a number of blocks, or instructions, as enclosed within the group 330, it would be determined that the parity bit is generated in block 302, but not used before being generated in block 306. In other words, the parity flag would not be live out of block 302, and the translated code for that block would not include instructions for generating this flag. Therefore by increasing the size of the translated region, increased optimization can be obtained by eliminating the unnecessary translation of the parity bit in block 302. Likewise, as the region size or block size increases the translator will have greater knowledge of which components are redundant and which are not redundant, allowing for increased optimization of the translation.

Referring back to FIG. 2, it can be seen that efficiency tends to increase as the region size increases. Also with reference to FIG. 2, it is important to remember that the curve shape can vary with such factors as the kind of optimization being implemented and the particular application. It should be additionally noted that it has been observed through numerous observations that as the region size increases there is a general tendency for the optimization efficiency level to plateau as shown in FIG. 2. With reference to the initial scope of step 106, an initial block size could be determined based on a basic block or a subset of a basic block, where a basic block is a sequence of instructions between instruction flow changes.

It would be understood by one skilled in the art, that in step 108, where the translation of the block is performed, that it could be performed by any method of translation and optimization. As previously noted, the curve of FIG. 2 would vary according to the optimization method selected.

Figure 4:
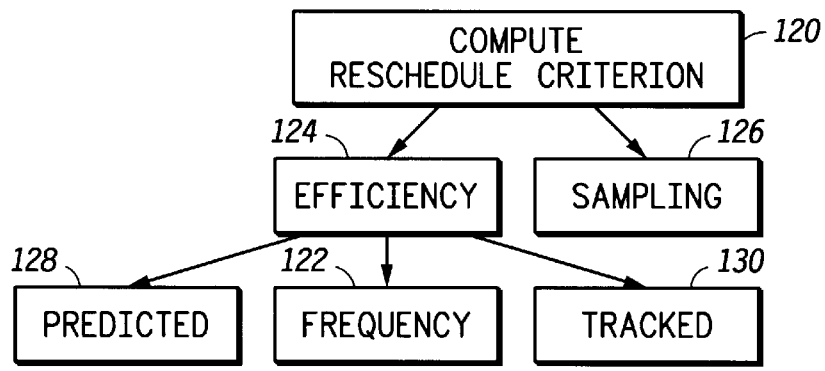
FIG. 4 illustrates, in diagram form, an extension of a portion of the flow diagram of FIG. 1.

FIG. 4 illustrates some alternatives available for determining the reschedule criterion of step 112. A first criterion would be sampling 126. With sampling 126, a computer program periodically samples the application running to determine where it is and based on this a counter would be incremented. A second alternative is efficiency 124. This criterion determines where on the projected or tracked curve of FIG. 2 the scope and efficiency currently lie. For example, referring to FIG. 2, if it is determined the current region size for block A is represented as shown on the horizontal axis, the overall efficiency rating is 30%. Therefore, the determination could be made that an increased region size would improve optimization efficiency.

The efficiency criterion can be utilized more effectively by also looking at the frequency 122 of execution of the block. For example, a running counter could be incremented each time a specific block is encountered. The reschedule criterion could use the estimated improvement in efficiency to determine that if a block were retranslated, it would take a certain number of executions of the block to recover the cost of retranslation. This determination would require an estimate of the cost of retranslation for the particular scope. In this case, the retranslation criterion would take into account the estimated improvement in efficiency possible, the frequency with which the block was executed, and the cost of retranslating.

For another block the optimization curve and computed optimization efficiency would indicate that increasing the code extent would have no beneficial affect, but that increasing the translation optimization would have a beneficial affect. For a block already optimally translated, it would be determined that the reschedule criterion should be set such that no further translations occur. It should be noted that the alternatives shown in FIG. 4 do not form an exhaustive list, and it is recognized that there may be other methods used for establishing a rescheduling criterion. It should also be noted that other combinations of sampling and efficiency could be used.

Figure 5:
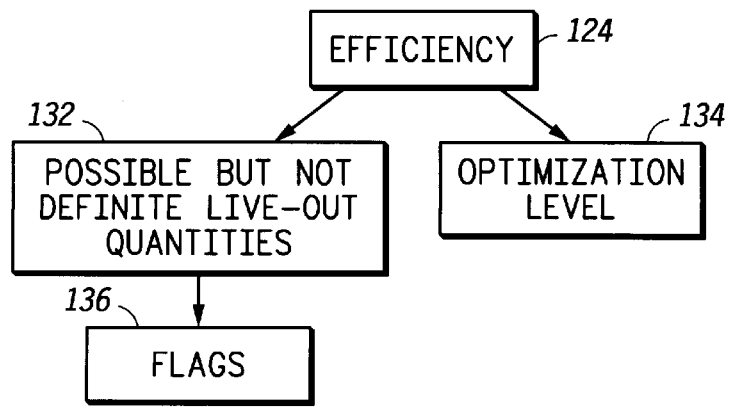
FIG. 5 illustrates, in diagram form, an extension of a portion of FIG. 1.

FIG. 5 illustrates two ways of measuring efficiency as computed in step 110. The efficiency 124 could look at the number of possible but not definitely live-out quantities 132, such as the parity flag or other flags 136 discussed previously in the context of FIG. 3. The code optimization level 130 used in translating the code is another measure of efficiency. It is well known in the art that various types of code optimization exist. Examples of these optimizations would be constant propagation, copy propagation, global value numbering, loop recognition, loop transformations, and code motion. While this list is not meant to be an exhaustive list, it is representative of commonly applied optimizations. The code efficiency 124 of a block could reflect the optimization level 134 such as those listed, and what the code has been subjected to. Therefore code efficiency could be improved by adding types of optimization to blocks that have been previously optimized.

Figure 6:
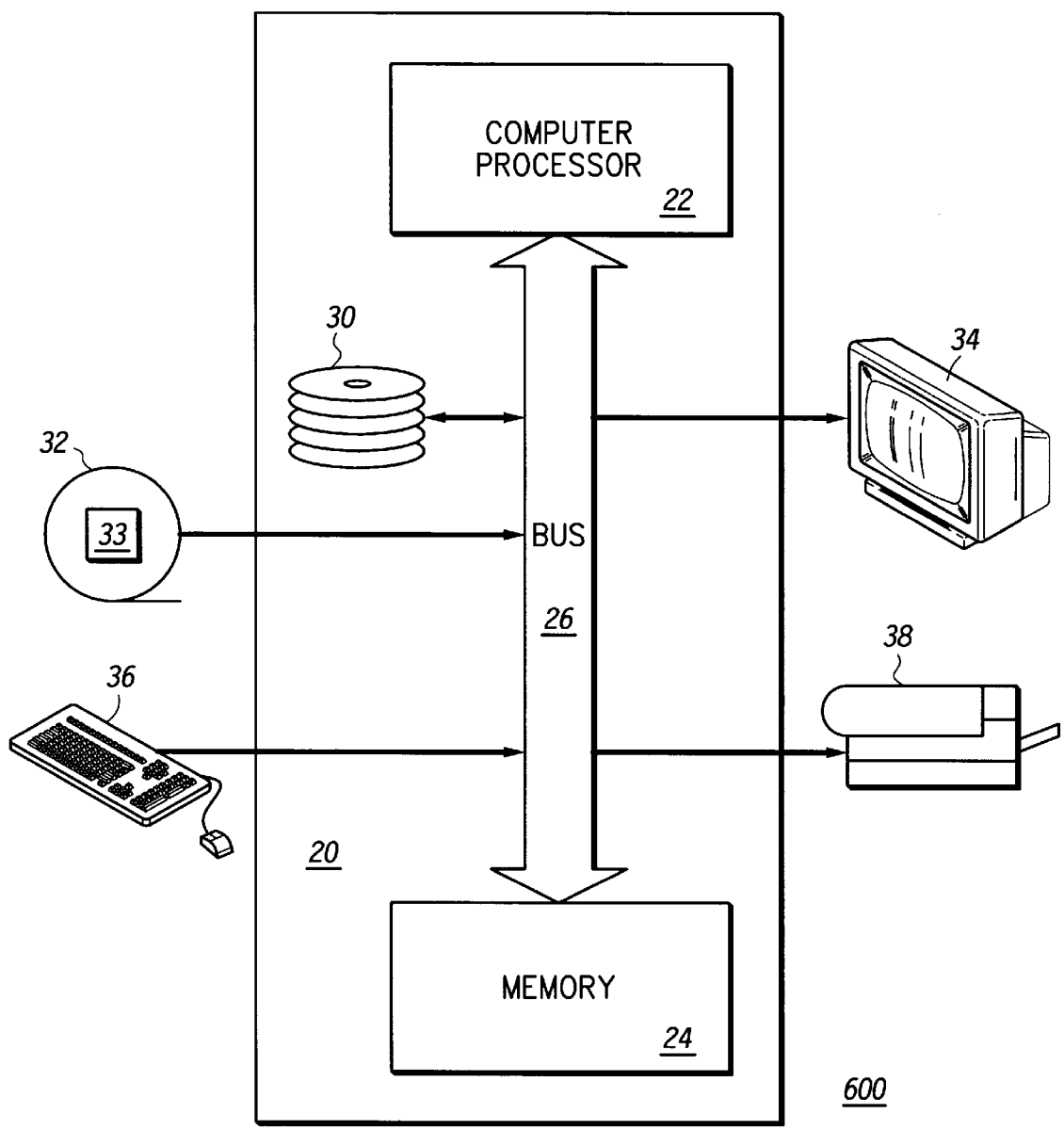
FIG. 6 illustrates, in block diagram form, a computer system 600 used for implementing one embodiment of the present invention.

FIG. 6 is a block diagram showing a General Purpose Computer system 600. The General Purpose Computer system 600 has a native Computer Processor 22, and Memory 24, connected by a Bus 26. Memory 24 includes relatively high speed machine readable media such as DRAM, SRAM, ROM, FLASH, EEPROM, and bubble memory. Also connected to the Bus are Secondary Storage 30, External Storage 32, output devices such as a monitor 34, input devices such as a keyboard (with mouse) 36, and printers 38. Secondary Storage 30 includes machine readable media such as hard disk drives, magnetic drum, and bubble memory. External Storage 32 includes machine readable media such as floppy disks, removable hard drives, magnetic tape, CD-ROM, and even other computers, possibly connected via a communications line. The distinction drawn here between Secondary Storage 30 and External Storage 32 is primarily for convenience. As such, it should be appreciated that there is substantial functional overlap between these elements. Executable versions of computer software implementing a version of the present invention and foreign user programs can be read from the External Storage 32 and loaded for execution directly into the Memory 34, or stored on the Secondary Storage 30 prior to loading into Memory 34 and execution.

It should now be apparent that the present invention overcomes several disadvantages of the prior art. First, the present invention reduces translation overhead by performing a minimal translation on code regions, until it can be determined further translation and optimization size will be beneficial. Further, the present invention uses efficiency curves to determine when and how further when retranslation should be performed. This further reduces execution time by eliminating unjustified attempts at re-optimizing. The present invention by utilizing an optimization efficiency curve removes the need to rely solely on frequency of execution as a criterion for retranslation.

Those skilled in the art will recognize that modifications and variations can be made without departing from the spirit of the invention. For example, code translation can also imply code optimization depending on the specific translator being used, or translation and optimization could be separate steps. For example, at step 108, a translation could occur with no formal optimization taking place. Conversely, optimization of previously optimized code could occur. Another option would be to retranslate using new translation parameters that would affect optimization. Therefore, it is intended that this invention encompass all such variations and modifications as fall within the scope of the appended claims.

We claim:

1. A method of optimizing software translation, comprising the steps of:
   a) accessing a next block;
   b) testing whether the next block has been translated;
   c) if the next block has not been translated, specifying a block scope equal to an initial block scope;
   d) translating the next block into a translated block according to the block scope;
   e) specifying a reschedule criterion for retranslating the next block;
   f) if the next block has been translated and the reschedule criterion has been satisfied, respecifying the block scope before translating the next block in step (d) and specifying a reschedule criterion in step (e); and
   g) repeating steps (a) through (f) as a loop.

2. The method in claim 1 which further comprises:
   h) executing the translated block within the loop in step (g).

3. The method in claim 1 wherein step (e) includes:
   utilizing sampling.

4. The method in claim 1 wherein step (e) includes:
   utilizing an efficiency metric.

5. The method in claim 4 wherein step (e) also includes:
   utilizing frequency.

6. The method in claim 4 wherein:
   the efficiency metric is based on predicted efficiency levels.

7. The method in claim 4 wherein:
   the efficiency metric is based on tracked efficiency levels.

8. The method in claim 4 wherein:
   the efficiency metric includes a measure of possible but not certain live-out quantities.

9. The method in claim 4 wherein:
   the efficiency metric includes a measure of code efficiency.

10. The method in claim 1 wherein:
    the next block is in binary object code format.

11. The method in claim 1 wherein:
    the next block is a byte stream.

12. A method of optimizing software translation, comprising the steps of:
    a) accessing a next block;
    b) testing whether the next block accessed in step (a) has been translated;
    c) if the next block has not been translated, specifying a block scope equal to an initial block scope;
    d) translating the next block into a translated block according to the block scope;
    e) computing optimization efficiency of the translated block;
    f) specifying a reschedule criterion for retranslating the next block;
    g) if the next block has been translated and the reschedule criterion has been satisfied, respecifying the block scope before performing steps (d), (e), and (f);
    h) executing the translated block; and
    i) repeating steps (a) through (h) as a loop.

13. A computer readable medium containing software for optimizing software translation, said software comprising:
    a) a set of one or more computer instructions for accessing a next block;
    b) a set of one or more computer instructions for testing whether the next block has been translated;
    c) a set of one or more computer instructions for specifying a block scope equal to an initial block scope if the next block has not been translated;
    d) a set of one or more computer instructions for translating the next block into a translated block according to the block scope;
    e) a set of one or more computer instructions for specifying a reschedule criterion for retranslating the next block;
    f) a set of one or more computer instructions for respecifying the block scope before translating the next block in element (d) and specifying a reschedule criterion in element (e), if the next block has been translated and the reschedule criterion has been satisfied; and
    g) a set of one or more computer instructions for repeating elements (a) through (f) as a loop.

14. A data processing system for optimizing software translation, comprising:
    a) means for accessing a next block;
    b) means for testing whether the next block has been translated;
    c) means for specifying a block scope equal to an initial block scope if the next block has not been translated;
    d) means for translating the next block into a translated block according to the block scope;
    e) means for specifying a reschedule criterion for retranslating the next block;
    f) means for respecifying the block scope before translating the next block in element (d) and specifying a reschedule criterion in element (e), if the next block has been translated and the reschedule criterion has been satisfied; and
    g) means for repeating elements (a) through (f) as a loop.

15. A method of translating code, comprising the steps of:
    (a) identifying a portion of code to be translated;
    (b) providing an optimization curve representative of a current efficiency level and expected efficiency levels for a given parameter;
    (c) translating the code based on the current efficiency level.

16. The method of translating code of claim 15, wherein the step of translating further comprises:
    (d) translating the code only if the current efficiency level is less than at least an one of the expected efficiency levels.

17. The method of translating the code of claim 15, wherein the step of translating, the parameter indicates a code region size to be translated.

* * * * *